(12) United States Patent
Lopez

(10) Patent No.: US 7,669,730 B2
(45) Date of Patent: Mar. 2, 2010

(54) BEVERAGE CUP WITH STORAGE BIN AND BOTTLE OPENER

(75) Inventor: Carlos A. Lopez, Miami, FL (US)

(73) Assignee: Productopop, Inc., Miami, FL (US)

( * ) Notice: Subject to any disclaimer, the term of this patent is extended or adjusted under 35 U.S.C. 154(b) by 334 days.

(21) Appl. No.: 11/900,698

(22) Filed: Sep. 13, 2007

(65) Prior Publication Data

US 2009/0071969 A1    Mar. 19, 2009

(51) Int. Cl.
*A47G 19/22* (2006.01)

(52) U.S. Cl. .................. 220/713; 220/592.17; 220/315; 220/810; 220/694; 220/755

(58) Field of Classification Search ................ 220/293, 220/315, 500, 501, 503, 592.17, 694, 713, 220/735, 755, 756, 757, 810; 81/3.09
See application file for complete search history.

(56) References Cited

U.S. PATENT DOCUMENTS 5,203,467 A * 4/1993 Tucker .................... 220/254.3
6,783,019 B2 * 8/2004 Zettle et al. .............. 220/254.3
7,011,227 B2 * 3/2006 Ward et al. ............... 220/254.3

* cited by examiner

*Primary Examiner*—Anthony Stashick
*Assistant Examiner*—Madison L Wright
(74) *Attorney, Agent, or Firm*—Alberto A. León, Esq.; Bauman, Dow & León P.C.

(57) ABSTRACT

The present invention discloses and claims a multifunctional beverage cup that can be used to contain and dispense beverages and to store small items. The cup of the present invention comprises a cup body, a lid means and a storage bin which engages a recess in the cup body. The lid means comprises a hinged port cover, which both covers the drinking port in the lid means and comprises a bottle opening means. The cup body comprises a recess in its exterior surface which acts as a storage compartment when the storage bin is engaged to the recess.

10 Claims, 4 Drawing Sheets

BEVERAGE CUP WITH STORAGE BIN AND BOTTLE OPENER

BACKGROUND OF THE INVENTION

1. Technical Field of the Invention

This invention generally relates to beverage containers. More specifically, this invention relates to drinking cups. Still more particularly this invention relates to a multifunction beverage drinking cup with a storage bin and a bottle opener.

2. Description of the Background Art

Drinking cups have remained virtually unchanged since their inception. Simply put: a watertight vessel is manufactured from a large array of possible materials to create a container for beverages. The addition of handles, stems and lids lends variety to the form of the cup. More recently, multiple layers of thermally insulating materials and disposable materials have been used for manufacturing cups that maintain the beverage's desired temperature.

Many patents have been issued for drinkware. The vast majority of the prior art includes patents and patent applications claiming and disclosing new ornamental features for drinking cups. A small number of disclosures, such as foldable and disposable cups, contain utility features which are new and useful. In contrast, the present invention comprises a new and useful drinking cup, which incorporates both a storage bin and a bottle opener. The cup of this invention can be manufactured using materials and a design which result in favorable thermal properties.

One problem that is frequently encountered at a party or other public gathering is where to put small items to keep them from being lost or stolen. This is especially true if the garments being worn do not have pockets. Such items can include car keys, money, identification and credit cards, cigarette packs, lighters, writing utensils, business cards or any other small item that would be found in pants pockets or a purse. In addition, when beverages are being consumed that require a bottle opener to open, it is helpful to have access to a bottle opener. An integrated bottle opener in the lid of the drinking cup addresses this need.

The present invention solves these problems by providing an insulated drinking cup that includes a storage bin for small items and obviates the need for a separate bottle opener by having a bottle opener integrated into the lid.

An object of the present invention is to provide a new and improved drinking cup having capabilities of storage for small items to free up the hands and ensure that important items, such as keys, identification cards and money are not lost.

Another object of the present invention is to provide a bottle opener as an integral part of the container for holding the beverage in the bottle to be opened.

SUMMARY OF THE INVENTION

The apparatus of the present invention comprises an insulated plastic or metal drinking cup that is generally cylindrical in shape. The cup comprises an integrated handle means for ease of carrying. The cup also comprises a lid means that is threaded into place to cover the top of the cup to prevent spilling. The lid comprises a raised ridge along its outer circumference to prevent liquid from spilling down the sides of the cup, an opening near the edge through which the beverage in the cup can pass, and an insert that snaps into the center of the lid. The insert in turn comprises a rubbery plug that mates to the opening in the lid and a bottle opener means. A portion of the exterior of the cup is recessed and engages a clear plastic storage bin. The plastic storage bin is optionally held in place at the front of the cup by one or more lips that protrude from the cup along the margins of the recess.

DETAILED DESCRIPTION OF THE PREFERRED EMBODIMENT OF THE INVENTION

Figure 1:
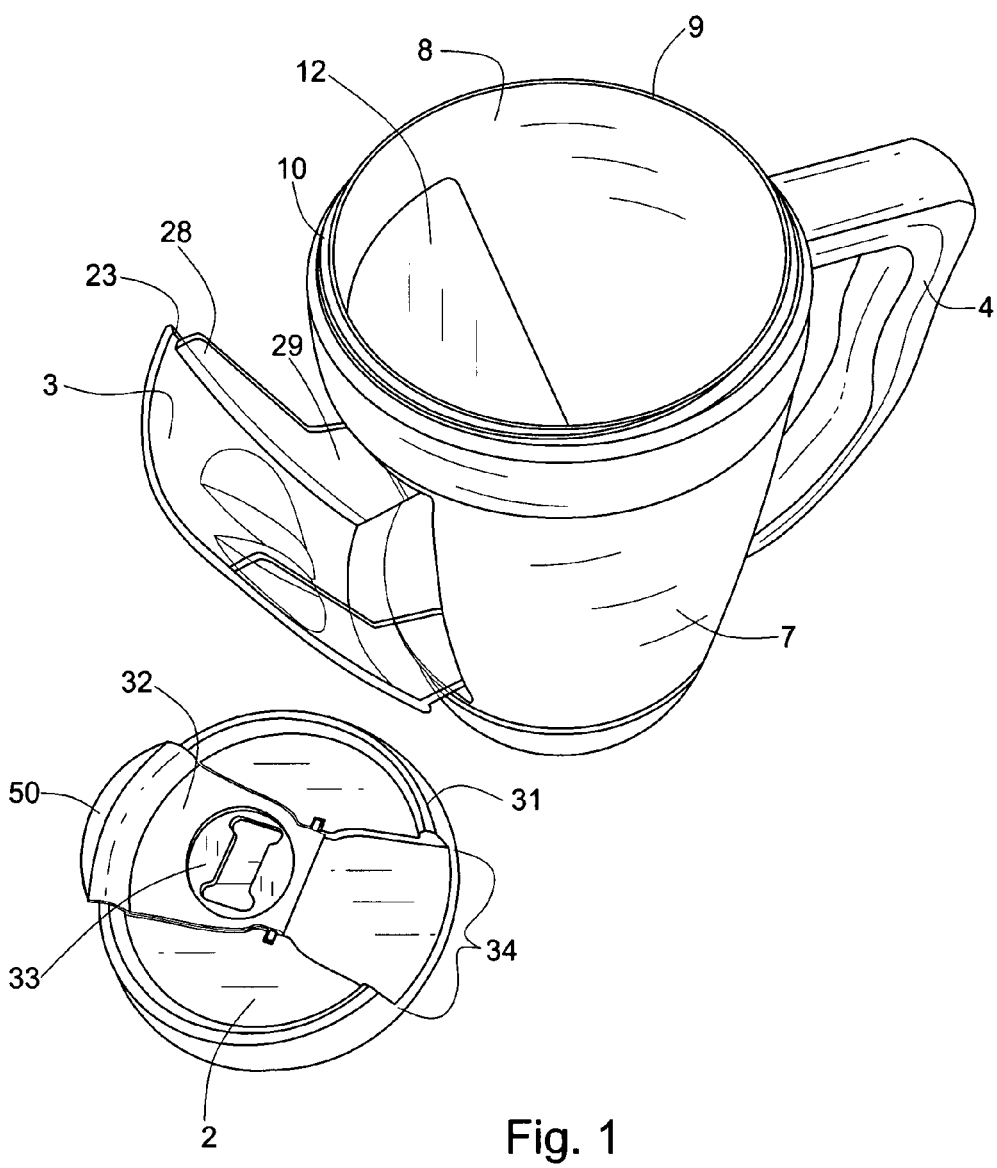
FIG. 1: is a perspective view of the preferred embodiment of the invention with the lid means removed and the storage bin open.
Figure 2:
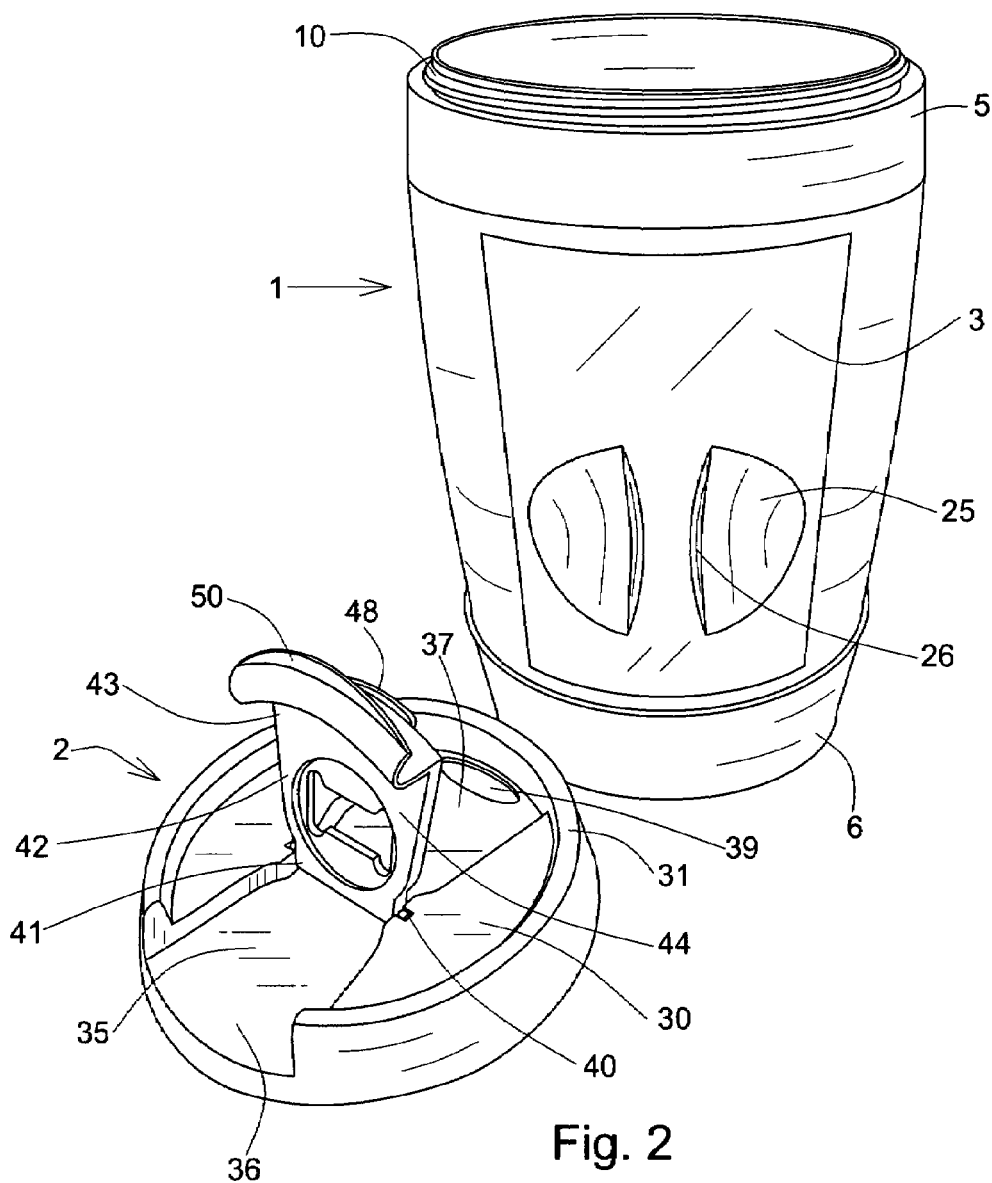
FIG. 2: is a perspective view of the preferred embodiment of the invention with the storage bin closed, the lid means engaged to the cup body and the hinged port cover raised.
Figure 3:
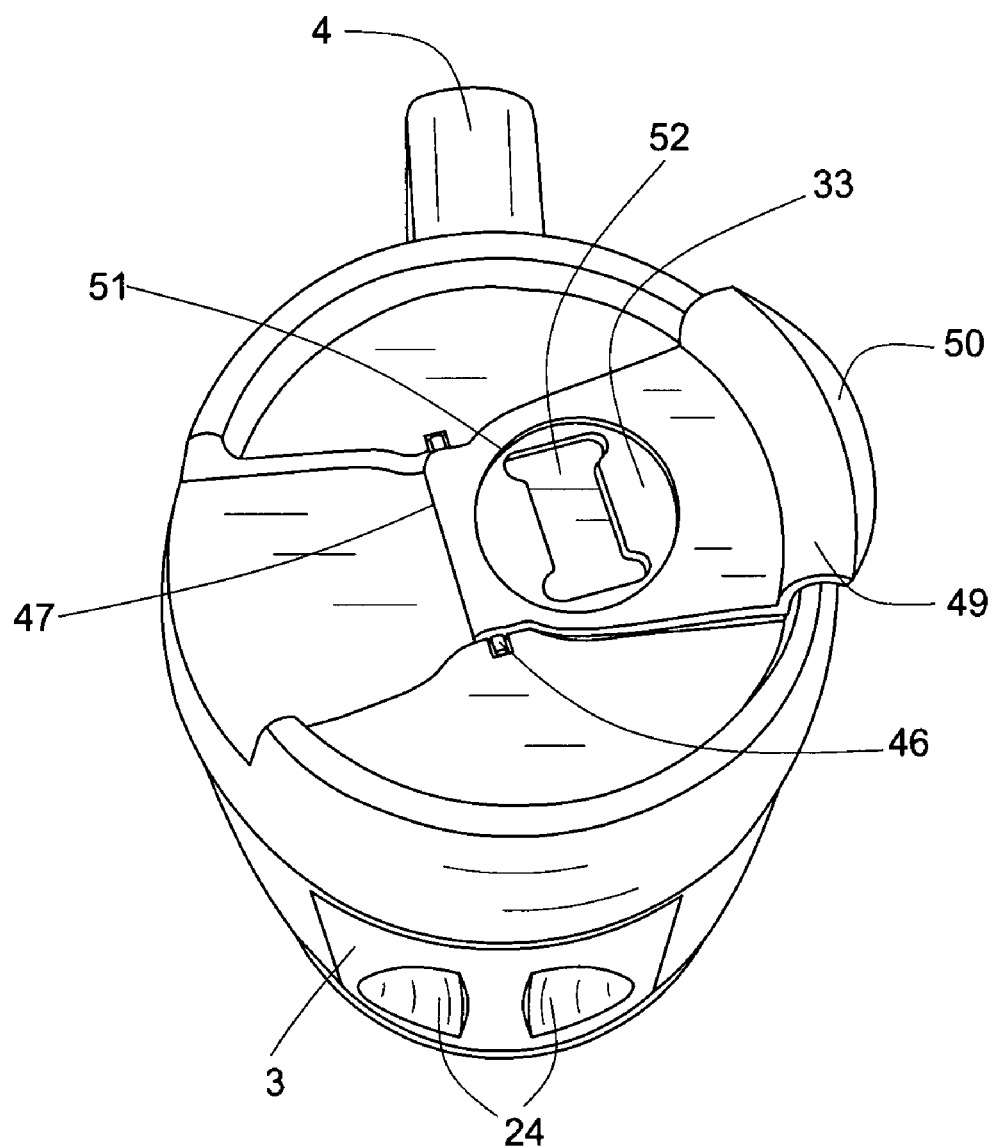
FIG. 3: is a top view of the preferred embodiment of the invention with the storage bin closed and the lid means engaged to the cup body.
Figure 4:
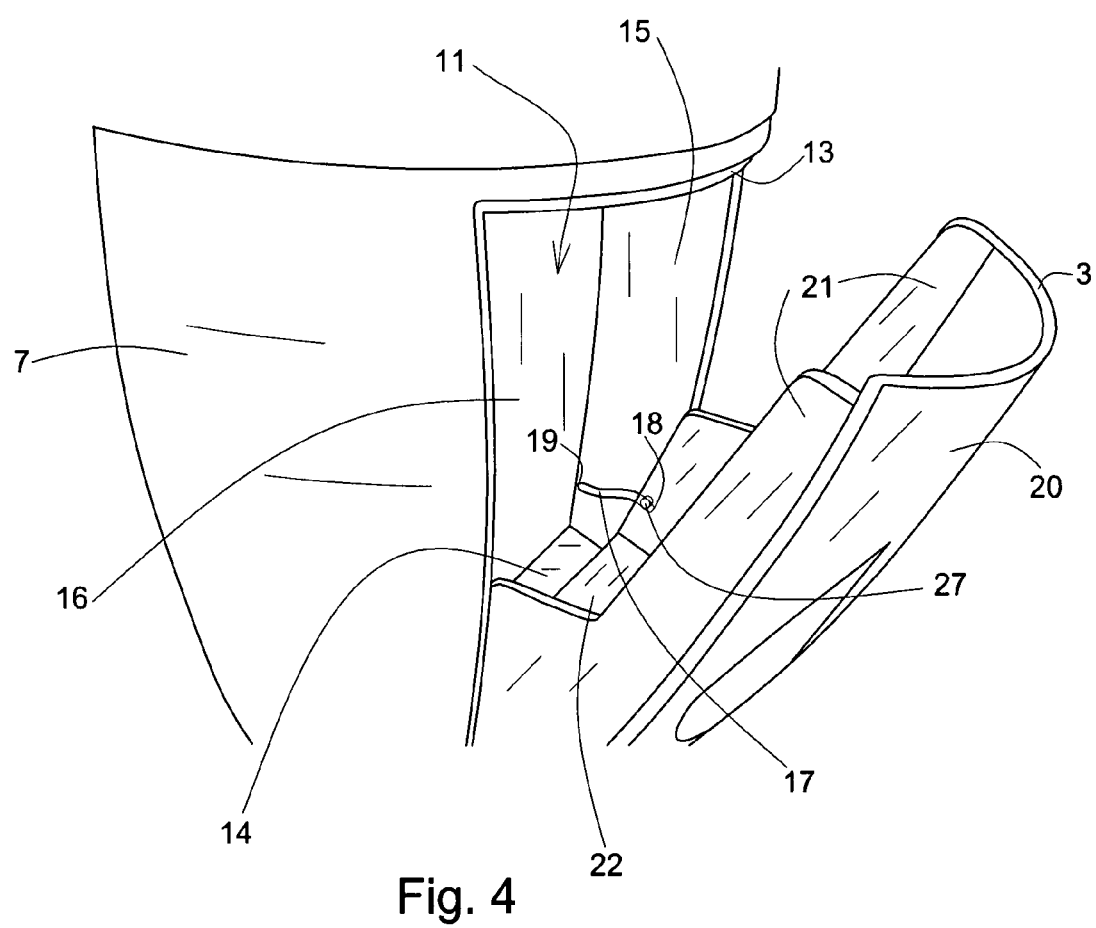
FIG. 4: is a close-up view of the storage compartment of the invention with the storage bin open.

The preferred embodiment of the invention comprises a cup body (1), a lid means (2), a storage bin (3) and handle (4), all of which are injection molded plastic. In alternative embodiments, all or parts of the invention may be manufactured from metal or plastic covered with a layer of metal. The cup body is preferably insulated to maintain the temperature of the beverage inside of it.

The cup body (1) is generally cylindrical and is comprised of a top side (5), a base (6), an exterior surface (7) and an interior surface (8). The top (5) side of the cup comprises an opening (9) and a threaded rim (10) capable of receiving a threaded lid means. The base (6) is relieved with a molded stability rim along the exterior circumference to stabilize the cup, even if the bottom surface is uneven. The exterior surface (7) of the cup body comprises a rectangular recess (11), which engages the storage bin (3). The recess may vary in height, width and depth. The recess (11), in combination with the storage bin (3) acts as a storage compartment. The recess results in a chord (12) which bisects the interior surface (8) of the cup body. In the preferred embodiment, the recess does not extend all the way to the threaded rim at the top side of the cup body, so that the beverage can cover the recess (11) in the interior surface of the cup body and the user can easily drink from the cup at any angle. However, in alternative embodiments, the recess can be of any height that the design of the cup allows. The exterior surface (7) of the cup body further comprises a handle means (4), although alternative embodiments may be produced without a handle means. The handle means is either adjacent to or opposite to the recess on the exterior surface of the cup body.

The recess (11) in the exterior surface of the cup body comprises a bin face relief (13) around its perimeter. The outer perimeter of the storage bin (3) nests in the bin face relief (13), resulting in the storage bin becoming contiguous with the exterior surface (7) of the cup body. The recess (11) further comprises a roof, a floor (14), two identical sides (15) and a back (16). Each side has an angled hinge guide groove (17) near the floor (14) of the recess, the angled hinge guide groove comprising a start point (18), an end point (19) and an angled portion between the start point and the end point, the start and end points being horizontal and parallel to each other. The end point (19) is nearest the back (16) of the recess and the angled portion is at a downward angle from the start point towards the end point. The two guide grooves (17) are directly across from each other and are capable of guiding the storage bin (3) from a closed position to an open position. The angled portion of the guide grooves assists in maintaining the storage bin in a closed position. Alternative embodiments of the invention may use other types of hinges to open and close the storage bin. Alternative embodiments of the invention may also comprise a locking means for the storage bin. The locking means can comprise one or more plastic lips that protrude from the exterior surface (7) of the cup body over a portion of the recess (11). The storage bin (3) can be snapped underneath the lips to hold it in a closed position. Alternative locking means could comprise one or more rotating arms movably attached to the exterior surface of the cup body that are capable of rotating over the edge of the recess and holding the storage bin in a closed position.

The storage bin (3) is preferably made of clear plastic, allowing its contents to be viewed without opening the bin. The storage bin comprises a bin face (20), two identical sides (21) and a bottom (22). The bin face (20) is radiused in like diameter to the cup body's exterior surface (7), resulting in the storage bin being flush with and contiguous to the exterior surface of the cup body when the storage bin is in the closed position. The bin face (20) comprises an inner side and an outer side. The bin face's inner side comprises a relief interface (23) along its perimeter, the relief interface being capable of firmly engaging the bin face relief (13) in the exterior of the cup body when the storage bin is pushed into a closed position in the cup body's recess (11). In embodiments of the invention that comprise a locking means, the locking means is capable of engaging the outer side of the bin face to hold the storage bin in a closed position. The outer side of the bin face comprises a grasping means (24), which the user can grasp between the fingers to assist in opening the storage bin (3). In the preferred embodiment, the grasping means (24) comprises two finger relief areas (25), the relieved areas creating two vertical surfaces (26) which can be grasped by the fingers. The sides (21) of the storage bin comprise an interior surface and an exterior surface. The exterior surfaces are adjacent to the sides (15) of the recess. The exterior surface of each side comprises a nipple (27), which is located and sized appropriately to engage the angled hinge guide groove (17) in the adjacent side of the recess. When the nipples engage the guide grooves, the nipples slide along the guide grooves when the user opens or closes the storage bin, keeping the storage bin in proper alignment. The sides (21) of the storage bin further comprise a top end (28) and a bottom end (29), the bottom end being adjacent to the bottom (22) of the storage bin. The bottom end is similar in width to the width of the sides (15) of the recess to aid in cargo retention and rigidity of the storage bin. As the sides of the storage bin approach the top end (28), the sides are relieved for ease of closure. The bottom (22) of the storage bin is similar in size to the floor (14) of the recess. In alternative embodiments of the invention, the storage bin may have a back to assist in cargo retention and retrieval.

The lid means (2) comprises an outer side (30), an inner side, a raised outer circumference (31) and a hinged port cover (32). The hinged port cover (32) houses the bottle opener (33). The inner side of the lid is threaded and capable of securely engaging the threaded (10) top side of the cup body. The raised outer circumference (31) is higher than the level of the outer side (30) of the lid means, resulting in the outer side of the lid means being relieved. The raised outer circumference is non-contiguous and comprises a gap (34), where its level is not raised above the outer side of the lid means. The outer side of the lid means comprises a relieved area (35) capable of fully nesting the hinged port cover (32) in both its open and closed positions. The relieved area comprises a first end (36), a second end (37) and two sides (38). The first end terminates at the gap (34) in the raised outer circumference, the gap being as deep as the relieved area. The second end (37) terminates at the raised outer circumference (31) and comprises a beverage port (39) near the raised outer circumference and opposite to the gap (34). The beverage port comprises an opening from the inner side of the lid means to the outer side of the lid means. The port (39) is of a size and shape appropriate for the passage of a beverage without spilling into the mouth of the user when the user presses the lower lip of the mouth onto the raised outer circumference (31) and tilts the base (6) of cup body upward. Each side (38) of the relieved area comprises a press-fit hinge relief groove (40). The grooves are directly opposite each other and are capable of firmly engaging the hinged port cover (32).

The hinged port cover (32) is capable of fully nesting in the relieved area (35) of the outer side of the lid means (2) when it is in either the open or closed position. The hinged port cover comprises an interior end (41), a center (42), an exterior end (43), a top side (44), and a bottom side (45). The interior end (41) comprises a press-fit hinge and terminates in a rounded edge (47). The press-fit hinge engages the press-fit hinge relief grooves (40) in the relieved area of the lid means. The press-fit hinge comprises two projections (46), which are sized to be capable of snapping into the press-fit hinge relief grooves (40) and remaining securely within the relief grooves. When the press-fit hinge is snapped into the relief grooves, the rounded edge (47) of the interior end allows the hinged port cover (32) to rotate axially about the exterior of the lid means from a closed to an open position. The bottom side of the hinged port cover comprises a rubberized beverage port plug (48) located near its exterior end (43). The shape and location of the beverage port plug enables it to mate firmly with the beverage port (39) when the hinged port cover is in the closed position. The rubbery material ensures that the beverage in the cup cannot pass through the beverage port when the beverage port plug is firmly engaged with the beverage port. The exterior end of the hinged port cover comprises an arched section (49) and an opening/closing flange (50). The arched section (49) is shaped to lock onto the raised outer circumference (31) of the lid means when the hinged port cover (32) is in the closed position. The width of the arched section (49) matches the specific arc degree of the gap (34) in the raised outer circumference (31) of the lid means. When the hinged port cover is in the open position, the arched section extends through the gap, allowing the hinged port cover to be fully nested in the relieved area (35) of the lid means and the bottom (45) of the hinged port cover to be flush with the outer side (30) of the lid means. The exterior end of the hinged port cover terminates in an opening/closing flange (50). The opening/closing flange is preferably parallel with the outer side (30) of the lid means when the hinged port cover (32) is in the open or closed position. The opening/closing flange acts as a handle for grasping and rotating the hinged port cover about the press-fit hinge. The center (42) of the hinged port cover comprises an opening (51). The opening comprises a metallic bottle opening insert (33). The bottle opening insert comprises an opening (52) of an appropriate size and shape for firmly engaging and removing a bottle cap from a bottle. Some users may prefer to remove the hinged port cover (32) from the lid means (2) when opening bottles. During manufacture the hinged port cover is injection molded around the bottle opening insert (33), so that the bottle opening insert cannot disengage from the hinged port cover without destroying the hinged port cover. Such a design for the preferred embodiment allows the bottle opening insert to withstand the pressure required to open a bottle without coming disengaged from the hinged port cover. In an alternative embodiment, the hinged port cover may be constructed of solid plastic without a bottle opening insert. Alternatively, the hinged port cover (32) may be constructed entirely of metal, rather than a metal insert in injection-molded plastic.

What is claimed is:

1. A beverage cup comprising:
   a. a generally cylindrical cup body, the cup body comprising a top side, a base, an exterior surface and an interior surface, the top side comprising an opening and a rim, the rim comprising threads and being capable of receiving a lid means, the base comprising a molded stability rim, the exterior surface comprising a rectangular recess, the recess comprising a bin face relief, the recess further comprising a roof, a floor, two sides and a back, each side comprising an angled hinge guide groove, the exterior surface further comprising a locking means, the cross-section of the interior of the cup comprising a chord where the recess intrudes into the interior;
   b. a lid means, the lid means comprising an outer side, an inner side, a raised outer circumference, and a hinged port cover, the inner side being threaded and capable of firmly engaging the top side of the cup body, the raised outer circumference being raised above the level of the outer side of the lid means in a non-contiguous fashion, the raised outer circumference comprising a gap, the outer side of the lid means comprising a relieved area, the relieved area comprising a first end, a second end and two sides, the first end terminating in the gap of the raised circumference, the second end comprising a beverage port opposite to the position of the gap in the raised outer circumference, the beverage port comprising an opening from the inner side to the outer side of the lid means of a size and shape appropriate for the passage of a beverage, each side of the relieved area comprising a press-fit hinge relief groove, the two grooves being opposite each other, the hinged port cover comprising an interior end, a center, an exterior end, a top side and a bottom side, the interior end comprising a press-fit hinge and a rounded edge, the press-fit hinge comprising two projections sized to firmly snap into the press-fit hinge relief grooves, the press-fit hinge terminating in the rounded edge allowing the hinged port cover to rotate axially about the exterior of the lid means, the bottom side comprising a rubberized beverage port plug near the exterior end, the beverage port plug being shaped and located in such a way that it mates firmly with the beverage port, the beverage port plug being capable preventing a beverage from passing through the beverage port when mated with the beverage port, the exterior end comprising an arched section and an opening/closing flange, the arched section being shaped to lock onto the raised circumference of the lid means and matching the specific arc degree of the gap of the raised circumference, the exterior end terminating in the opening/closing flange, the center of the hinged port cover comprising an opening that exposes a metallic bottle opening insert around which the hinged port cover was molded, the bottle opening insert comprising an opening of an appropriate size and shape to open a bottle the hinged port cover being capable of fully nesting in the relieved area of the outer side of the lid means in both an open or closed position; and
   c. a storage bin, the storage bin comprising an bin face, two identical sides and a bottom, the bin face comprising a relief interface along its perimeter, the relief interface being capable of firmly engaging the bin face relief in the exterior surface of the cup body so that the storage bin can be pushed into place in the rectangular recess, the bin face being radiused in like diameter to the exterior surface of the cup body, the storage bin's face further comprising a grasping means to allow the storage bin to be grasped between the user's fingers to assist in opening the storage bin, each side of the storage bin comprising an interior surface and an exterior surface, the exterior surface comprising a nipple, the nipple being sized to firmly engage the angled hinge guide groove in each side of the recess, the nipples being capable of engaging the hinge guide grooves so that the hinge guide grooves can guide the storage bin into proper position for closure, each side further comprising a bottom end and a top end, the width of each side matching the depth of the recess at the bottom end of the side and narrowing towards the top end of the side, the bottom of the storage bin being sized similarly to the floor of the recess, the storage bin being capable of engaging the cup body's rectangular recess in such a way that the storage bin can be opened and closed and is fully nested and flush with the exterior surface of the cup body when closed.

2. A beverage cup according to claim 1, wherein a handle means is fixedly attached to the exterior surface of the cup body located opposite or adjacent to the storage bin.

3. A beverage cup according to claim 1, wherein all or parts of the cup are manufactured from metal.

4. A beverage cup according to claim 1, wherein all or parts of the cup are manufactured from injection-molded plastic.

5. A beverage cup according to claim 1, wherein the cup body is thermally insulated.

6. A beverage cup according to claim 1, wherein the storage bin further comprises a back piece extending from one side to the other to form a pocket.

7. A beverage cup according to claim 1, wherein the grasping means of the storage bin comprises two finger relief areas, the relief areas creating two vertical surfaces for grasping the exterior surface of the storage bin.

8. A beverage cup according to claim 1, wherein the locking means is one or more lips of plastic that protrude from the exterior surface of the cup body over the recess, allowing the storage bin to be snapped into a closed position behind the lips.

9. A beverage cup according to claim 1, wherein the exterior surface of the cup body does not comprise a locking means.

10. A beverage cup according to claim 1, wherein the hinged port cover does not comprise a bottle opening insert.

* * * * *